United States Patent [19]

Euverard et al.

[11] Patent Number: 4,522,292
[45] Date of Patent: Jun. 11, 1985

[54] PATTERN FORMING APPARATUS AND PRODUCT ORIENTER THEREFOR

[75] Inventors: Maynard R. Euverard, Williamsburg, Va.; James J. Diver, South Holland; Thomas C. Schneider, Oak Forest, both of Ill.

[73] Assignee: Velten & Pulver, Inc., Chicago Ridge, Ill.

[21] Appl. No.: 457,431

[22] Filed: Jan. 12, 1983

[51] Int. Cl.$^3$ ............................................. B65G 47/24
[52] U.S. Cl. .................................... 198/374; 198/339; 198/434; 414/67
[58] Field of Search ............... 198/374, 413, 414, 434, 198/779; 414/67, 62; 53/544, 446; 198/379, 411, 394, 339, 344

[56] References Cited

U.S. PATENT DOCUMENTS

| | | | |
|---|---|---|---|
| 1,914,806 | 6/1933 | Hormel | 198/379 |
| 2,985,322 | 5/1961 | Parker | 414/67 |
| 4,176,741 | 12/1979 | Vogel | 198/779 |
| 4,205,742 | 6/1980 | Thomas et al. | 198/374 |
| 4,352,616 | 10/1982 | Brenner | 198/374 |

*Primary Examiner*—Joseph E. Valenza
*Attorney, Agent, or Firm*—Emrich & Dithmar

[57] ABSTRACT

An in-line pattern forming apparatus includes a windowed endless roller conveyor disposed in a longitudinal system path for sequentially receiving sets of articles. A friction shoe shifts the set of articles through the conveyor window to an underlying turntable which is rotatable for selectively reorienting the set, whereupon the lead roller at the end of the window pushes the set off the turntable to a staging support which sequentially receives a plurality of sets to form a pattern. The pattern is then swept as a unit from the staging support to a container loader or other associated apparatus in the system path. Means may be provided for selectively shifting sets of articles on the staging support laterally of the path to facilitate formation of certain patterns.

35 Claims, 26 Drawing Figures

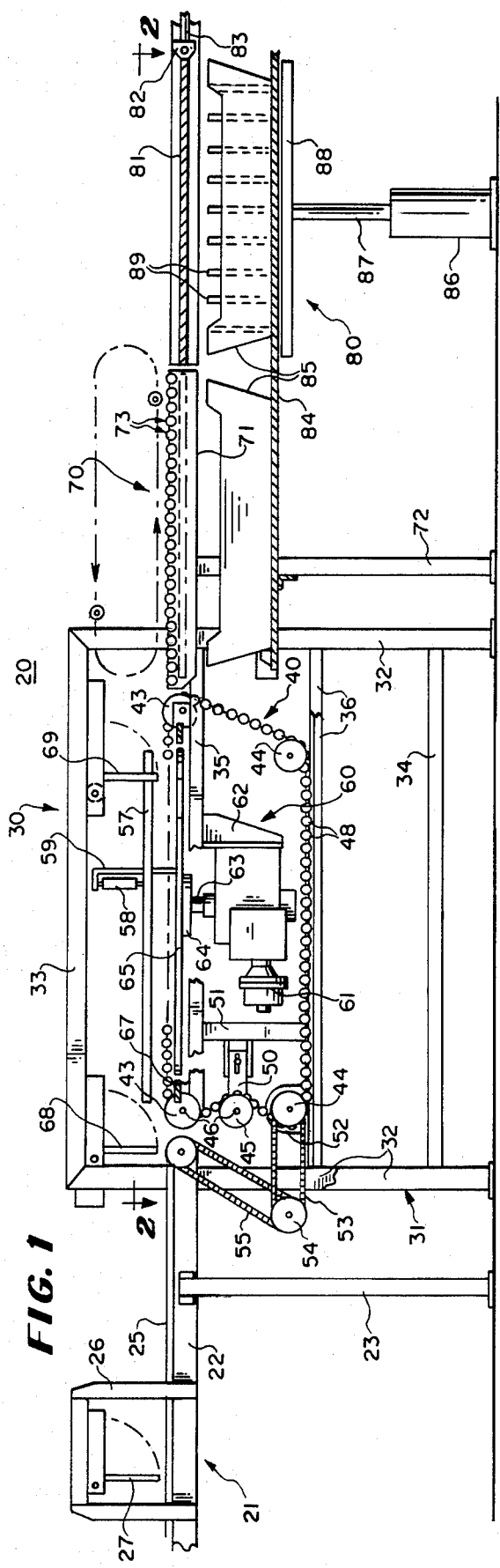
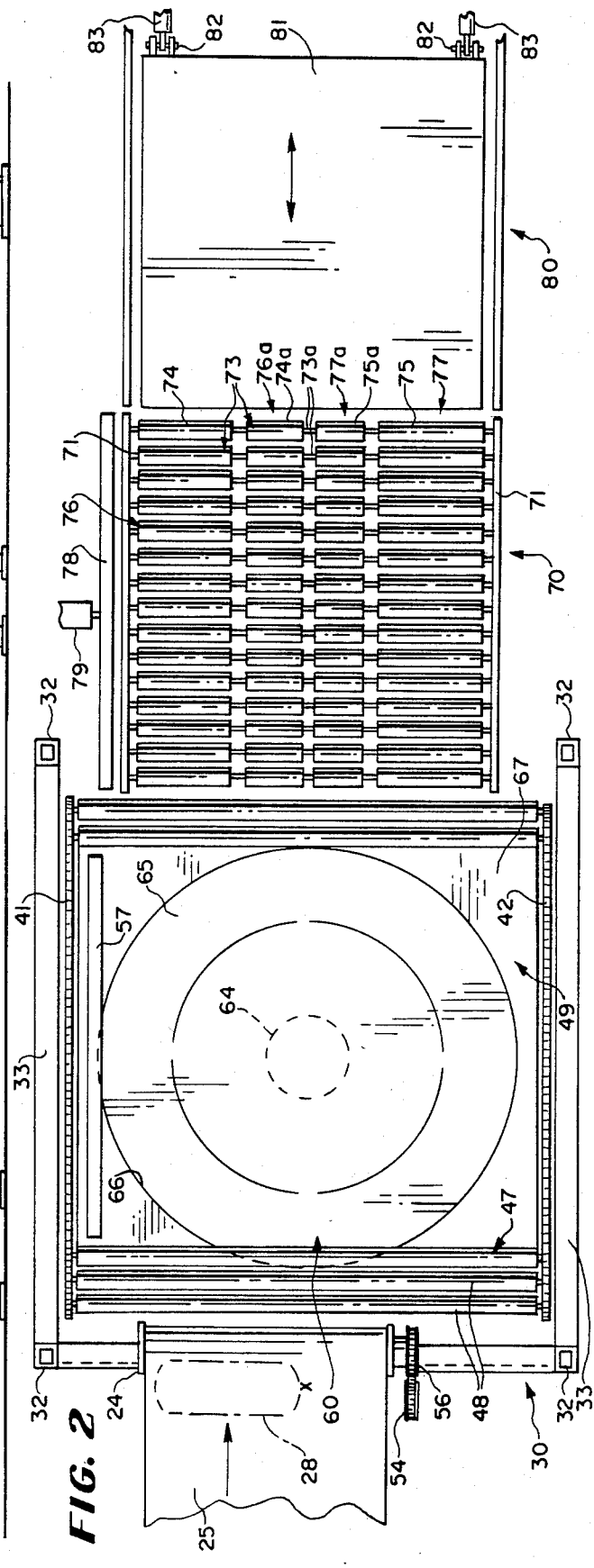
FIG. 1
FIG. 2

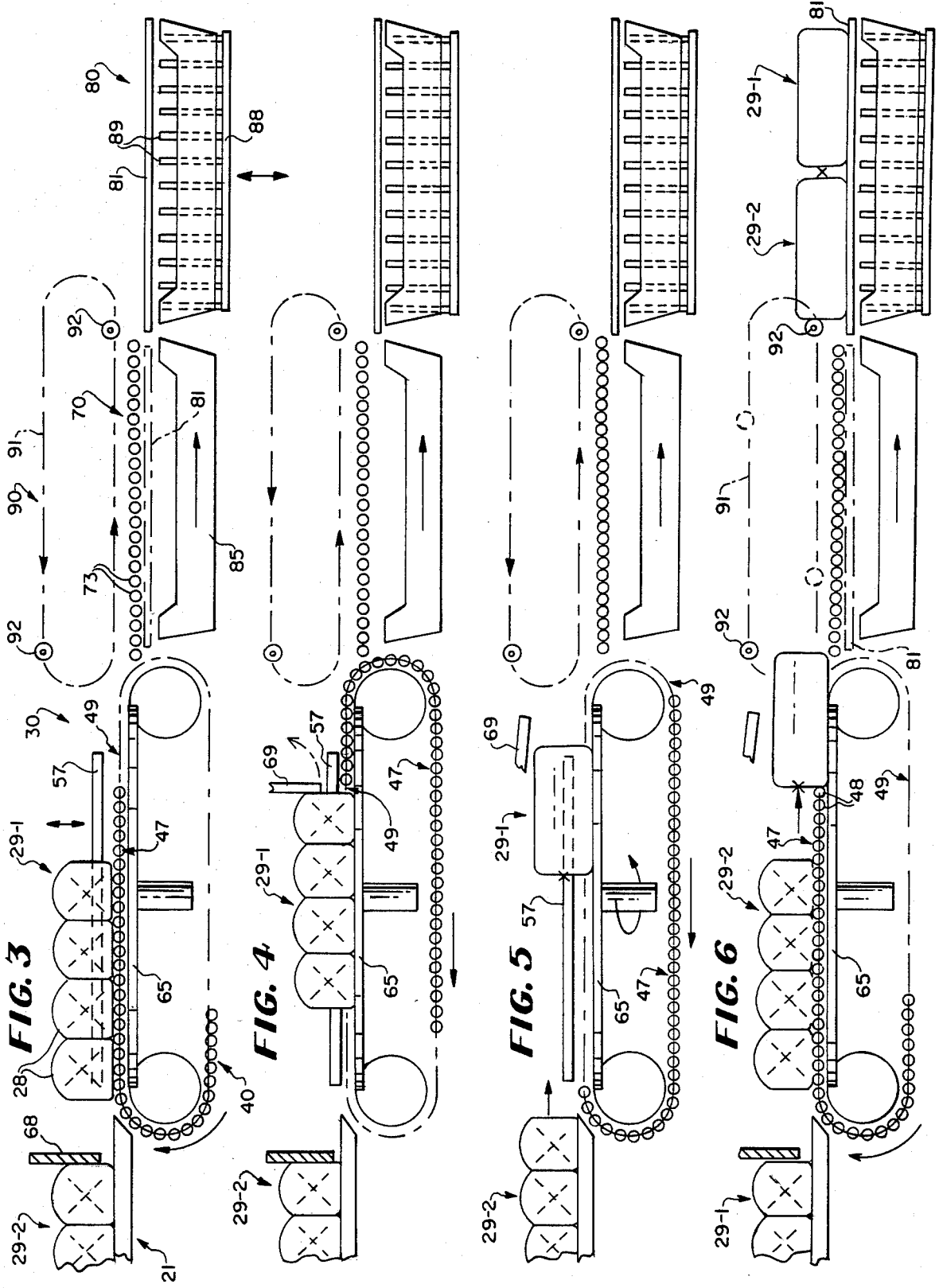

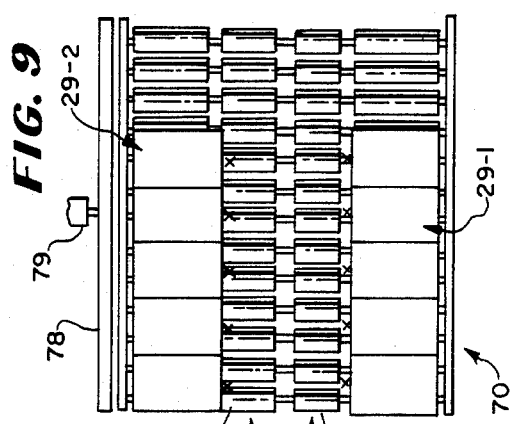
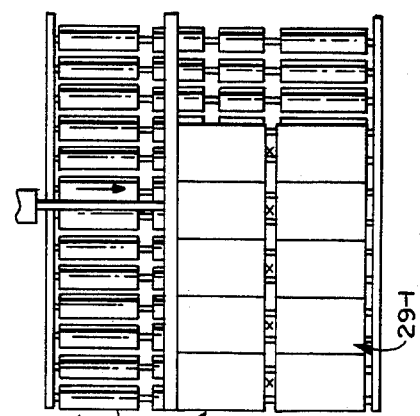
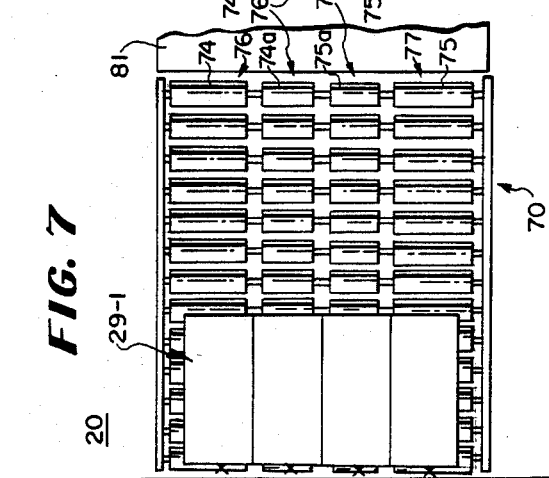
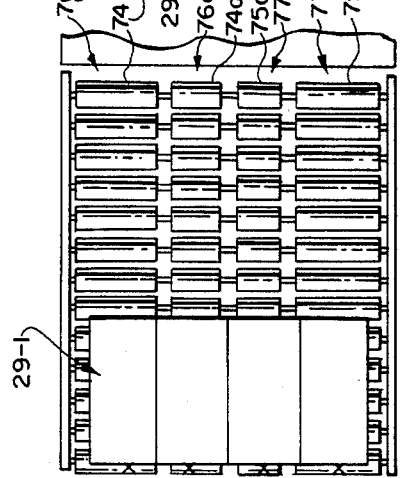
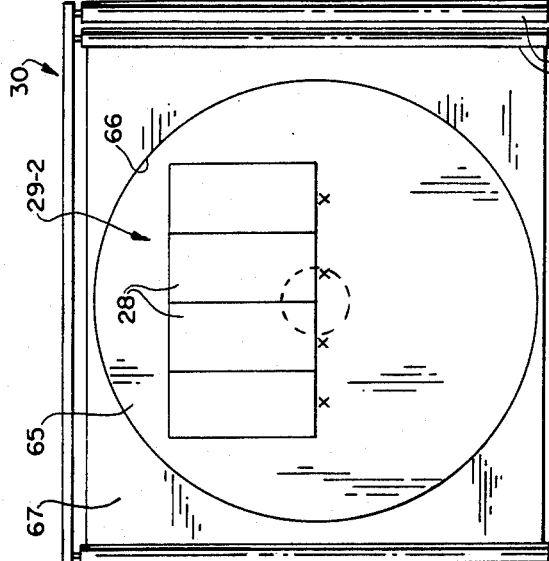
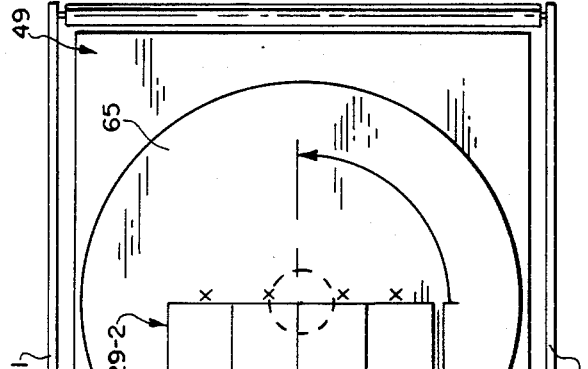
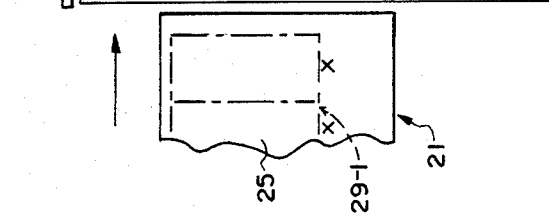
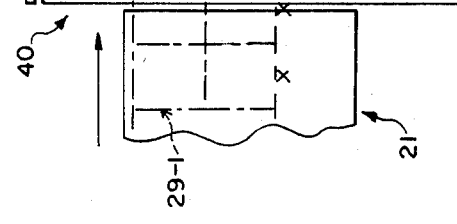

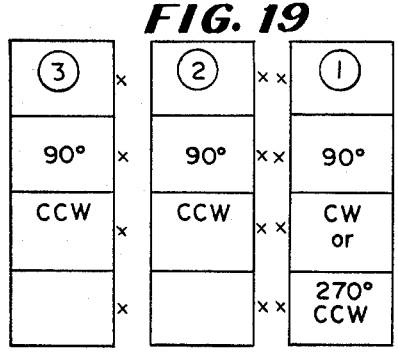
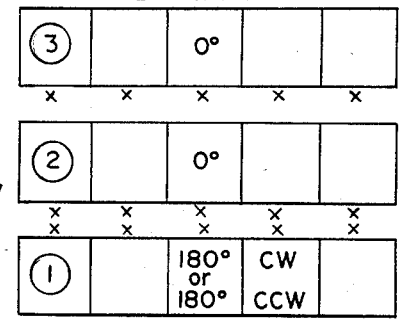
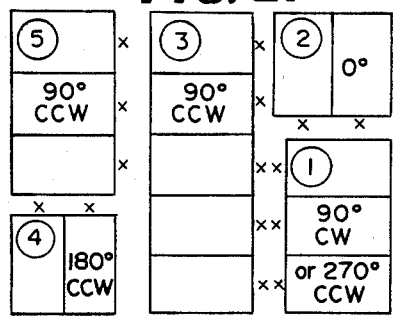
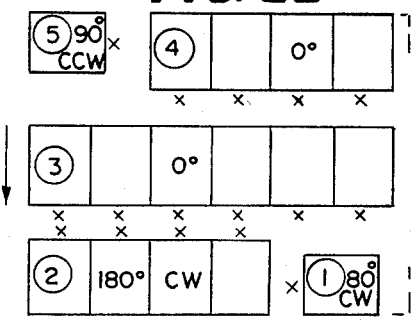
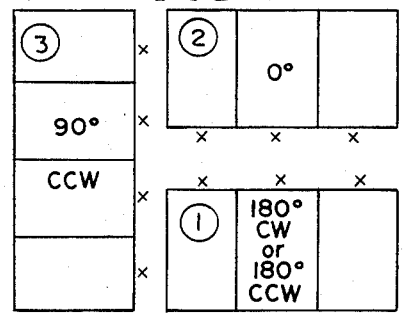
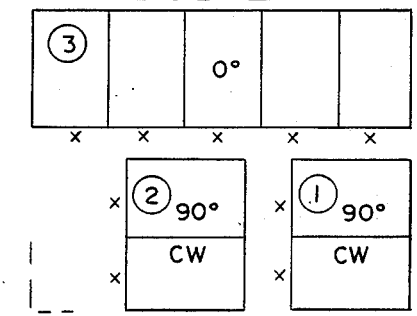
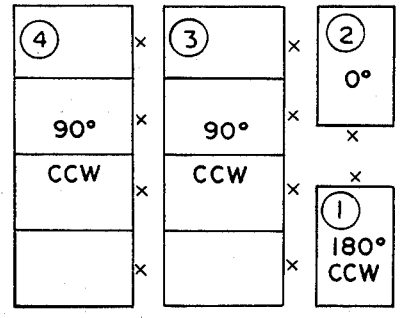
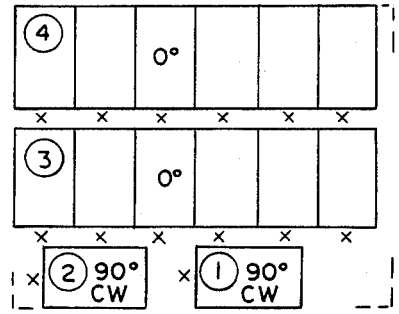

PATTERN FORMING APPARATUS AND PRODUCT ORIENTER THEREFOR

BACKGROUND OF THE INVENTION

The present invention relates to product handling equipment and, more particularly, apparatus for reorienting products and arranging the reoriented products in predetermined patterns. The present invention specifically relates to apparatus for the handling of products such as articles of baked goods, including packaged loaves of bread, buns, rolls, boxed products, and the like, as well as other types of goods which must be grouped in predetermined patterns.

It is common for baked goods such as loaves of bread, buns and the like to be packaged by placing them into individual plastic bags with the open end of each plastic bag being gathered and having a gripping closure placed therearound inwardly of the open end. The terminal portion of the bag outwardly of the closure expands to form a fantail end portion which is generally referred to in the bread packaging art as a "tail".

The packaged bread loaves or other baked goods are generally placed in trays or containers for transportation to retail outlets. The packages are typically arranged in a particular pattern for loading in the container, depending upon the size and shape of the container and the size and shape of the individual packages, so as to place the maximum number of packages in each container without damage to the packages and without having any portion of a package, including the tail, project beyond a container.

For this purpose, pattern forming devices are known in the art for arranging individual articles into predetermined patterns and then handling the pattern as a unit for loading into an associated container or the like. One such pattern forming arrangement is used in palletizing machines for arranging layers of packages for stacking on a pallet. But palletizers are designed for use with relatively large packages such as sacks of flour, cement, or the like and are typically not designed for use in handling fragile small articles such as packaged baked goods.

Pattern formers designed for handling packaged baked goods are disclosed, for example, in U.S. Pat. Nos. 3,739,902 and 3,779,363. But these devices, as well as many of the palletizing devices, require one or more changes in direction of the product path during the pattern forming operation. These changes in direction necessarily increase the amount of handling that each package must undergo, thereby increasing the chance of damage to the packaged products.

One type of palletizing apparatus disclosed, for example, in U.S. Pat. No. 2,971,659, effects the formation of patterns of products with only a single direction change. However, this apparatus requires a lifting of the products vertically from the conveyor path in order to effect reorientation thereof.

SUMMARY OF THE INVENTION

It is a general object of the present invention to provide an improved pattern forming apparatus and product orienter therefor which avoids the disadvantages of prior art devices while affording additional structural and operating advantages.

It is an important object of this invention to provide a product orienting apparatus which is characterized by in-line operation, for effecting reorientation of products without displacing them from a longitudinal path of travel.

In connection with the foregoing object, it is another object of this invention to provide an improved product orienting apparatus of the type set forth which effects reorientation of the product without lateral restraint thereof.

It is another object of this invention to provide an improved product orienting apparatus of the type set forth which is of simple and economical construction.

In connection with the foregoing objects, it is another object of this invention to provide a patter forming apparatus which incorporates the product orienting apparatus of the type set forth.

These and other objects of the invention are attained by providing product orienting apparatus comprising means for conveying product in a generally longitudinal path of travel, and support means disposed in the path and defining a reorienting plane, the support means being movable parallel to the reorienting plane for receiving the product from the conveying means along the path and selectively reorienting the product with respect to the path and discharging the reoriented product along the path.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of a pattern forming and container loading apparatus incorporating a product orienting apparatus constructed in accordance with and embodying the features of the present invention;

FIG. 2 is a fragmentary, top plan view of the apparatus illustrated in FIG. 1;

FIGS. 3–6 are enlarged, partially diagrammatic, side elevational views of the apparatus of FIG. 1, illustrating the apparatus at different stages of its operation;

FIGS. 7 and 8 are fragmentary, top plan views, similar to FIG. 2, illustrating the apparatus at two different stages of its operation;

FIGS. 9 and 10 are fragmentary top plan views of the pattern forming region of the apparatus of FIG. 1, illustrating lateral movement of products in formation of a pattern; and FIGS. 11–26 are diagrammatic plan views of representative patterns which can be formed with the apparatus of FIG. 1.

DESCRIPTION OF THE PREFERRED EMBODIMENT

Figure 11:
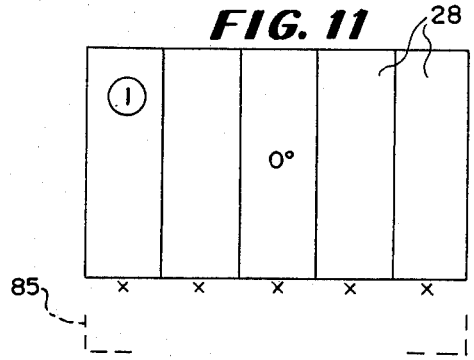

Referring to FIGS. 1 and 2 of the drawings, there is illustrated a system, generally designated by the numeral 20, constructed in accordance with and embodying the features of the present invention, for forming groups of articles into patterns and loading the patterns into containers. The system 20 includes an infeed conveyor 21 which conveys individual articles along a longitudinal path and groups the articles into sets with each set containing one or more articles. The infeed conveyor feeds the sets of articles to a product orienter 30 which selectively reorients the sets and sequentially transports them to a staging deck 70 on which a predetermined pattern of the sets is assembled, the pattern then being moved as a unit to a container loader 80 for loading into associated containers 85. The infeed conveyor 21, the product orienter 30, the staging deck 70 and the container loader 80 are all disposed in an in-line arrangement for moving the associated articles along a single longitudinal system path without moving the articles form the system path.

The infeed conveyor 21 is of standard construction, including a bed 22 supported on posts 23 (one shown). A roller 24 is rotatably mounted at one end of the bed 22 and receives therearound an endless conveyor belt 25, the support reach of which moves in the direction of the arrow in FIG. 2 for moving articles along the longitudinal system path. Carried by the bed 22 is an upstanding support bracket 26 on which is mounted a grouping gate 27 movable into and out of the path of the products conveyed on the infeed conveyor 21, selectively to stop the conveyed articles 28 to allow them to accumulate into sets 29 (see FIGS. 3–8) having any desired number of articles 28 therein. For purposes of illustration, the articles 28 have been depicted as loaves of bread in plastic bags tied at one end to form a tail in a well known manner, with each loaf extending transversely of the system path, as illustrated in FIG. 2. However, it will be appreciated that the system 20 could be used for handling other types of articles. While the infeed conveyor 21 has been illustrated as relatively narrow, it will be appreciated that it could be substantially wider. Furthermore, there may be provided along the infeed conveyor 21, preferably upstream of the support bracket 26, a lane-diverting mechanism for shifting the incoming train of articles 28 laterally of the infeed conveyor 21. Thus, the incoming train of articles 28 could be selectively positioned at either side of the infeed conveyor 21 or centrally thereof. Also, if desired, selected ones or groups of the articles 28 could be shifted in this manner. Several types of such lane diverting mechanisms are known, one type being sold by Velten & Pulver Inc. under the trademark "SELECT-O-FLOW".

The product orienter 30 includes a frame 31 comprising a plurality of upright posts 32 interconnected at the upper ends thereof by crossbars 33 and interconnected adjacent to the lower ends thereof by crossbars 34. Beams 35 and 36 are disposed intermediate the upper and lower ends of the posts 32 and extend horizontally for supporting associated equipment in a manner to be described below. The product orienter 30 includes an endless window roller conveyor, generally designated by the numeral 40. The window conveyor 40 includes a pair of laterally spaced-apart endless chains 41 and 42, each being guided over a pair of upper sprockets 43 and a pair of lower sprockets 44 and behind a tensioning sprocket 45, corresponding sprockets of the two chains 41 and 42 being fixedly secured to common shafts 46 for rotation about the axes thereof. The window conveyor 40 includes a conveyor section, generally designated by the numeral 47, comprising a plurality of freely-rotating rollers 48, each having the opposite ends thereof respectively secured to the chains 41 and 42 and extending transversely thereof, the rollers 48 being spaced apart longitudinally of the chains 41 and 42. The window conveyor 40 also includes a window section 49 which comprises a gap wherein no rollers 48 are provided.

The upper sprockets 43 cooperate to define therebetween the upper flight of the window conveyor 40. When the conveyor section 47 is disposed along the upper flight, the upper surfaces of the rollers 48 cooperate to define a substantially horizontal support plane. The tensioning sprockets 45 are carried on adjustment brackets 50 which are, in turn, supported on upright members 51 of the frame 31. The adjustment brackets 50 are movable for adjusting the tension in the chains 41 and 42. The window conveyor 40 is positioned so that the entry end of the support flight thereof is disposed closely adjacent to the exit end of the infeed conveyor 21.

The shaft 46 for the lower sprockets 44 at the entry end of the window conveyor 40 is supported in pillow blocks 52 (one shown) and carries on one end thereof a sprocket (not shown) engaging an endless chain 53, which also engages a sprocket 54 on a shaft rotatably supported outboard of the frame 31. The sprocket 54 is a double sprocket and also engages a chain 55, which is disposed in engagement with a sprocket 56 mounted on the end of the roller 24 of the infeed conveyor 21. Thus, it will be appreciated that driving force is imparted to the window conveyor 40 from the infeed conveyor 21 by means of the chains 55 and 53. The infeed conveyor 21 is driven by an associated drive unit (not shown) such as an electric motor.

Overlying the upper flight of the window conveyor 40 adjacent to one end of the rollers 48 is an elongated shoe 57 connected to the piston of an air cylinder 58 which is carried by a support 59 mounted on the frame 31 for effecting vertical reciprocating movement of the shoe 57 between a retracted position illustrated in FIG. 1 and a lower operating position in frictional engagement with the upper surfaces of the rollers 48 of the window conveyor 40 (see FIG. 4). It will be appreciated that when the shoe 57 is disposed in its operating position the clockwise rotation of the window conveyor 40, as viewed in FIG. 1, results in a counterclockwise rotation of the rollers 48 along the upper flight of the window conveyor 40 about their axes for causing articles supported thereon to be held stationary for a purpose to be explained more fully below. A window roller conveyor is disclosed, for example, in U.S. Pat. No. 4,030,620.

The product orienter 30 also includes a turntable assembly, generally designated by the numeral 60, carried by the frame 31. More particularly, the turntable assembly 60 includes a motor 61 mounted on a bracket 62 supported on the beams 35, the motor 61 having a vertically upwardly extending output shaft 63 which is fixedly secured to a hub 64 of a circular platform 65. The upper surface of the platform 65 is disposed immediately beneath the upper flight of the window conveyor 40 closely adjacent thereto and substantially parallel to the support plane thereof. The platform 65 is disposed in a circular aperture 66 in a rectangular support plate 67 carried by the frame 31, the upper surfaces of the support plate 67 and the platform 65 being substantially coplanar for providing a substantially continuous support surface. The platform 65 is mounted for rotation about the axis of the shaft 63, the peripheral edge of the platform 65 being disposed very closely adjacent to the surrounding edge of the support plate 67. Carried by the frame 31 and overlying the window conveyor 40 are two gates 68 and 69, respectively disposed adjacent to the exit ends of the infeed conveyor 21 and the window conveyor 40 for pivotal movement into and out of the path of articles conveyed thereby.

The staging deck 70 includes a frame having parallel side rails 71 and support posts 72. Rotatably supported between the side rails 71 are a plurality of longitudinally spaced-apart and transversely extending segmented rollers 73, each being rotatable about the axis of a shaft 73a. Each of the rollers 73 includes four laterally-aligned segments 74, 74a, 75 and 75a rotatable independently of each other. The segments 74 cooperate to define a section 76 of the staging deck 70, while the segments 74a cooperate to define a section 76a, the segments 75 cooperate to define a section 77, and the segments 75a cooperate to define a section 77a, the sections 76, 76a, 77 and 77a being disposed side-by-side along the staging deck 70. The upper surfaces of the rollers 73 cooperate to define a support surface which is disposed substantially coplanar with the upper surface of the turntable platform 65, with the entry end of the staging deck 70 disposed closely adjacent to the exit end of the support plate 67 of the turntable assembly 60. Overlying the staging deck 70 along one side edge thereof is an elongated pusher bar 78 secured to the piston of an air cylinder 79, disposed for effecting reciprocating movement of the pusher bar 78 transversely of the system path.

The container loader 80 includes a retractable support plate 81, the upper surface of which is disposed just below the level of the rollers 73 of the staging deck 70. The support plate 81 is mounted for sliding horizontal movement in an associated frame and is provided at one end thereof with a pair of clevis brackets 82, respectively coupled by connecting rods 83 to an associated drive mechanism (not shown) for effecting reciprocating movement of the support plate 81 between a normal support position illustrated in solid line in FIG. 1 and a retracted position disposed beneath the staging deck 70, and illustrated in broken line in FIG. 1.

Alternatively, the support plate 81 could be mounted so that in its normal support position its upper surface is substantially coplanar with the support surface defined by the rollers 73 of the staging deck 70. In this case, the support plate 81 could be fitted with cams which lower it upon retraction so that it can pass beneath the rollers of the staging deck 70, and raise it upon return to its normal support position. In this way the conveyed articles would not have to drop on to the support plate 81.

Disposed beneath the support plate 81 is a container conveyor 84, which may be of any desired type, for conveying containers 85 such as baskets or the like to and from a loading position beneath the support plate 81. While, for purposes of illustration, empty containers 85 have been shown as approaching the loading station from beneath the staging deck 70, it will be appreciated that they could approach the loading position from any other desired direction. In the configuration illustrated in FIG. 1 the container conveyor 84 would preferably enter laterally beneath the staging deck 70 so as to avoid interference with the product orienter 30. This arrangement also permits empty containers 85 to be fed laterally beneath the staging decks 70 of a plurality of parallel production lines like that illustrated in FIG. 1, it being common in bakeries, for example, to have separate lines for different types and sizes of product, several of which types may fit into the same type of container 85. The container conveyor 84 may leave the loading position beneath the support plate 81, either laterally of the system path or longitudinally to the right, as viewed in FIGS. 1 and 2. Alternatively, the container conveyor 84 could enter directly beneath the support plate 81 laterally thereof and exit either laterally or longitudinally.

The container loader 80 includes an air cylinder 86 having a vertically reciprocating piston rod 87 which is fixedly secured at the upper end thereof to a plate 88 carrying a plurality of upstanding parallel pins 89, which are much greater in number than the number of articles assembled in each pattern to be loaded in the container 85. The container conveyor 84, and the bottom of each of the containers 85 are provided with a plurality of apertures for respectively receiving the pins 89 upwardly therethrough in the loading position, as illustrated in FIG. 1, when the piston rod 87 is in its fully extended position. The upper ends of the pins 89 are substantially coplanar and define a support plane which is spaced a slight distance beneath the support plate 81 when the piston rod 87 is in its fully extended position. When the piston rod 87 is retracted, the pins are completely withdrawn to a position (not shown) beneath the container conveyor 84. Such retractable pin container loaders are disclosed, for example, in U.S. Pat. Nos. 4,030,620 and 4,154,043.

The staging deck 70 is provided with a discharge mechanism 90 (FIG. 3) for transferring completed patterns of articles formed thereon to the container loader 80. The discharge mechanism 90 may be of any of several types but, for purposes of illustration, it is shown as including a continuous chain 91 carrying two pusher bars 92 at equidistantly spaced-apart locations thereon, each of the pusher bars 92 projecting over the staging deck 70 parallel thereto and transversely of the system path. The chain 91 has a lower reach extending longitudinally of the system path and so positioned that when the pusher bars 92 are disposed along that reach they extend only a slight distance above the staging deck 70 for engagement with a pattern of articles thereon to move the pattern as a unit longitudinally from the staging deck 70 to the support plate 81 of the container loader 80.

It will be appreciated that the pincushion type of container loader 80 described above is merely illustrative, and other types of container loading devices could be used for different types of containers. Thus, for example, for very shallow types of containers such as trays or the like, the empty container could simply be fed forwardly (to the right as viewed in FIG. 1) from beneath the staging deck 70 in synchronism with the discharge mechanism 90 thereof, the conveyed articles 28 being allowed to fall directly into the container as they leave the end of the staging deck 70.

Figure 12:
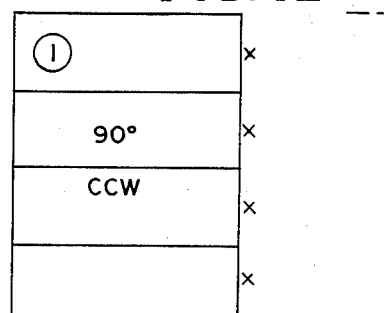
Figure 13:
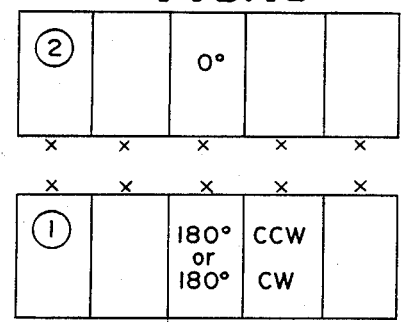
Figure 14:
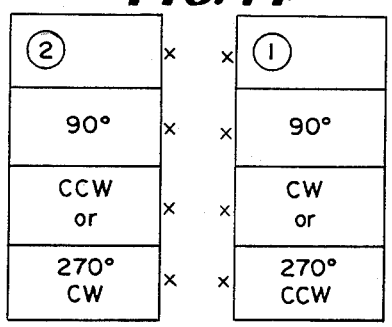
Figure 15:
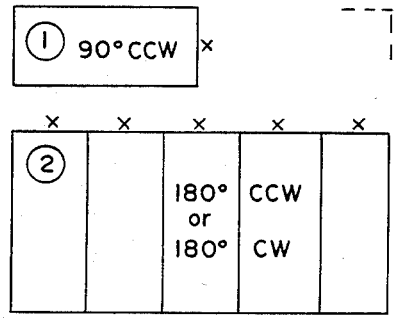
Figure 16:
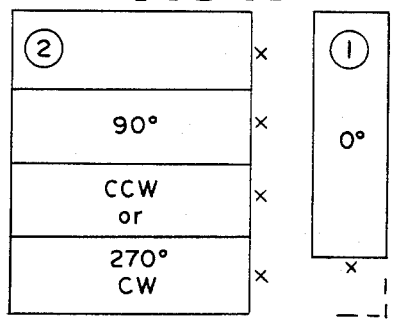
Figure 17:
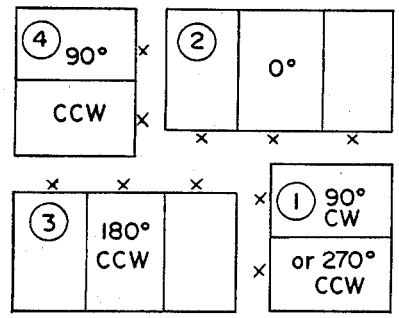
Figure 18:
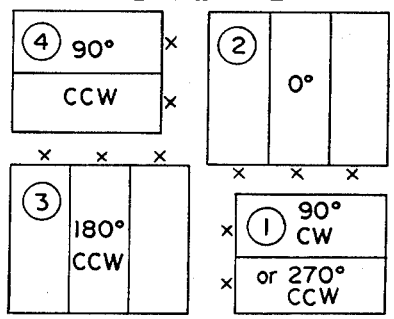

It will be appreciated that a suitable electrical control circuit (not shown) will be provided for the system 20 to control the operation thereof, the control circuit including suitable sensors, such as photoelectric sensors, limit switches and the like, in a well known manner. The circuitry will also include suitable sequencing means which is selectively operable for operating the system 20 in any of a number of different predetermined sequences for respectively forming different predetermined patterns of articles 28. Representative patterns of articles 28 which can be formed with the system 20 are illustrated, respectively, in FIGS. 11 through 26. In each of these figures the pattern is shown in its final configuration as it leaves the staging deck 70 and is loaded into the container loader 80. All of the patterns are generally rectangular in outline to correspond with a rectangular container 85, and it will be assumed that the four corners of the pattern fit respectively in the four corners of the container 85. In those patterns where this condition does not obtain, the unoccupied corners of the container 85 are diagrammatically illustrated in broken line. Different shapes and sizes of container and different shapes and sizes of article 28 can be accommodated with the present invention. Thus, the patterns of FIGS. 11–26 include examples of different sizes and shapes of articles 28.

The long dimension of the container 85 could be disposed either parallel to or perpendicular to the longitudinal axis of the system path. Each of the patterns is illustrated in top plan view, so that the staging deck 70 is to the left. Thus, the pattern arrives from the left and the individual sets of articles in each pattern arrive at the staging deck 70 from the left. To facilitate an understanding of the formation of the patterns, the sets 29 of articles in each pattern are respectively numbered with encircled numerals in the order in which they arrive at the staging deck 70, and each set 29 bears a designation indicating the angular rotation which it undergoes on the product orienter 30. Thus, for example, the designation "0°"indicates that the set of articles passes through the product orienter 30 without rotation; the designation "90° CW" indicates that the set was rotated 90° clockwise; and the designation "90° CCW" indicates that the set was rotated 90° counterclockwise.

Referring now also to FIGS. 3 through 8 of the drawings, the operation of the system 20 will be described in detail. For purposes of illustration, the operation will be described during formation of the pattern illustrated in FIG. 14, and in order better to correlate this description with FIG. 14, the first set 29 of the pattern of FIG. 14 has been designated 29-1 in FIGS. 3–8, while the second set has been designated 29-2. It will be understood that normally the system 20 will be set to form a particular pattern and will typically operate repeatedly to form that pattern through a large number of cycles. If the type of product article or the type of container being handled is changed, then the pattern will have to be changed and this will necessitate changes in settings of the associated control circuit.

Typically, the articles 28 are conveyed from left to right along the infeed conveyor 21, with the long dimension of the articles 28 being disposed transversely of the path of travel and with the tail of the article 28 disposed downwardly, as viewed in FIGS. 2, 7 and 8. The articles 28 are spaced apart along the infeed conveyor 21 and are accumulated by the grouping gate 27 into sets 29. In the configuration illustrated each set 29 will comprise four articles 28. Thus, the gate 27 may be moved down to its position blocking the path of the articles 28 along the infeed conveyor 21 for stopping them and allowing the conveyor belt 25 to pass therebeneath until four articles 28 have been accumulated in a side-by-side contiguous set 29, at which time the gate 27 is lifted to allow the set 29 to pass to the exit end of the infeed conveyor 21. It will be appreciated that many types of accumulating devices for conveyor systems are known and that any suitable accumulating mechanism could be used to form the sets 29, the gate 27 being described simply for purposes of illustration.

When the first set 29-1 reaches the exit end of the infeed conveyor 21, it is stopped by the gate 68 and held until the appropriate time for entry onto the product orienter 30. The infeed conveyor 21 is positioned so that the set 29-1 will enter upon the product orienter 30 toward the upper half of the turntable platform 65, as viewed in FIG. 2, and this configuration is used for formation of all of the patterns illustrated in FIGS. 11–26. However, it will be appreciated that, if desired for the formation of other types of patterns, the positioning of the infeed conveyor 21 with respect to the product orienter 30 could be changed, or the lane diverting mechanism of the infeed conveyor 21 could be operated, so that the sets 29 would enter at other locations along the platform 65.

The window conveyor 40 moves on demand in a clockwise direction, as viewed in FIG. 1. When the leading end of the conveyor section 47 arrives at the upper flight of the window conveyor, the gate 68 is lifted and the infeed conveyor 21 feeds the set 29-1 onto the conveyor section 47 of the window conveyor 40. In this regard, it will be appreciated that the adjacent ends of the infeed conveyor 21 and the window conveyor 40 are closely spaced a distance substantially less than the width of a conveyed article 28 so that the articles 28 pass freely between the two conveyors without interruption. Alternatively, transition support means between the two conveyors could be provided, if desired, in a well known manner. The conveyor section 7 of the window conveyor 40 supports the set 29-1 and conveys it to the right over the support plate 67 and the platform 65. When the entire set 29 has moved onto the window conveyor 40, the gate 68 is returned to its blocking position for stopping the next set 29-2 on the infeed conveyor 21, as illustrated in FIG. 3.

As the set 29-1 is conveyed over the platform 65 by the window conveyor 40, the gate 69 is lowered to its blocking position, illustrated in FIG. 4, to prevent the conveyed articles 28 from being fed off the product orienter 30. When the first set 29-1 has reached the predetermined desired location over the platform 65, the shoe 57 is lowered into frictional engagement with the rollers 48 of the window conveyor 40 along the upper flight thereof for causing the engaged rollers to rotate in a counterclockwise direction, as viewed in FIG. 4. This counterclockwise rotation of the rollers 48 serves to hold the set 29-1 stationary while the conveyor section 47 of the window conveyor 40 continues to pass therebeneath substantially without friction. As the trailing end of the conveyor section 47 passes beneath the articles 28 of the set 29-1, the articles 28 drop sequentially through the window section 49 onto the platform 65. When the entire set 29-1 has dropped onto the platform 65, the shoe 57 is lifted back to its normal retracted position.

The platform 65 is then rotated 90° clockwise to bring the set 29-1 to the position illustrated in FIG. 5, the window section 49 being long enough to accommodate unobstructed rotation of the set 29-1 through any desired angle up to 180° . When the leading end of the conveyor section 47 again arrives at the upper flight of the window conveyor 40, the gate 68 is lifted to allow the next set 29-2 to be conveyed onto the window conveyor 40, as indicated in FIG. 5. When the leading end of the conveyor section 47 reaches the reoriented set 29-1 it pushes it off the platform 65 and support plate 67 and onto the segmented rollers 73 of the staging deck 70, as indicated in FIG. 6. It will be appreciated that the set 29-1 is now disposed with the longitudinal axes of the individual articles 28 extending parallel to the longitudinal system path. Since the set 29-1 contains four articles 28, it spans all of the sections 76, 76a, 77 and 77a of the staging deck 70, as indicated in FIG. 7. Since the rollers 73 are not powered, the set 29-1 remains at the entry end of the staging deck 70, with the tails of the articles 28 all pointing back toward the product orienter 30. When the set 29-1 has passed from the platform 65, the gate 68 is lowered to its blocking position.

The second set 29-2 is then stopped in the desired position over the platform 65 and, by operation of the shoe 57, is then dropped through the window section 49 onto the platform 65, as described above. When the complete set 29-2 has been deposited on the platform 65, the platform 65 is rotated 90° counterclockwise to bring the set 29-2 to the position illustrated in FIG. 8. Then, as the leading end of the conveyor section 47 of the window conveyor 40 engages the set 29-2, it pushes it off the platform 65 and the support plate 67 onto the staging deck 70, pushing the set 29-1 ahead of it so that the pattern of FIG. 14 results on the staging deck 70.

Before the set 29-1 of the next pattern is moved onto the staging deck 70, the completed pattern is discharged therefrom by use of the discharge mechanism 90. Thus, the chain 91 is actuated for moving one of the pusher bars 92 down into engagement with the trailing end of the pattern and pushing it longitudinally off the staging deck 70 and onto the support plate 81 of the container loader 80, as indicated in FIG. 6. The chain 91 is then stopped in the position illustrated in FIG. 6 to allow the next set 29-1 to be moved onto the staging deck 70, the lower one of the pusher bars 92 serving as a stop to prevent articles 28 from traveling off the end of the staging deck 70 until the desired time for discharge of the next pattern. The support plate 81 is then retracted back beneath the staging deck 70 to the position illustrated in broken line in FIG. 6, retrograde movement of the pattern of articles 28 being prevented by the pusher bar 92. Thus, as the support plate 81 is retracted, the sets 29-1 and 29-2 of the formed pattern drop onto the upper ends of the pins 89, which are then lowered for lowering the pattern of articles 28 into the container 85. The filled container 85 is then conveyed away and an empty container is moved into loading position over the pins 89, which are then moved back up through the corresponding openings in the bottom of the container 85 to their product-receiving position. The support plate 81 is returned to its original loading position for receiving the next pattern of articles 28.

It will be appreciated that instead of the support plate 81 being moved immediately back to its normal support position after discharge of the previous set of articles therefrom, it could be retained in its retracted position beneath the staging deck 70 until the next set of articles 28 is ready to be discharged therefrom by the discharge mechanism 90. Then, the support plate 81 could be moved back to its normal support position in synchronism with the movement of the pusher bar 92 so that the conveyed articles could drop sequentially thereonto, thereby avoiding any sliding relative movement of the conveyed articles with respect to the support plate 81.

Furthermore, it will be appreciated that the lateral feeding of the empty containers 85 to the system 20 is accommodated by the presence of the staging deck 70. However, if a different type of feeding movement of the containers 85 were permissible, the staging deck 70 could be eliminated, and the sets of articles 28 could be discharged from the product orienter 30 directly to the container loader 80, the patterns of articles then being formed directly on the support plate 81.

The operation of the system 20 is similar for formation and loading of each of the other patterns illustrated in FIGS. 11-19, 21, and 23-25. Thus, for each of these patterns, after each set 29 has undergone the indicated rotation on the turntable platform 65, it will be in position so that when it is discharged from the product orienter 30 it will move into the indicated pattern position, either directly or by being pushed into that position by succeeding sets 29 of the pattern.

However, in the case of the patterns of FIGS. 20, 22, and 26, certain sets 29 of these patterns will not be in proper position as they exit the product orienter 30. In order to move these sets into proper position, the pusher bar 78 is used. Thus, referring, for example, to the pattern of FIG. 20, the first set 29-1 will be in proper position and can be pushed from the product orienter 30 directly onto the staging deck 70 and remain in that position. The second set 29-2 however, undergoes no rotation and, therefore, will simply be pushed across the top of the turntable assembly 60 and arrive on the staging deck 70 in the position illustrated in FIG. 9. The set 29-2 cannot remain in this position because the third set 29-3 also undergoes no rotation and will be discharged into the same position on the staging deck 70 occupied by the set 29-2. Accordingly, before discharge of the set 29-3 from the product orienter 30, the set 29-2 is moved laterally by the pusher bar 78 to the position illustrated in FIG. 10, thereby providing a space for the arrival of a set 29-3. Similar lateral movements by the pusher bar 78 are also necessary for the third sets 29 of the patterns in FIGS. 22 and 26, as indicated by the arrows in those figures.

It will also be noted that for patterns such as those in FIGS. 22 and 26, the division of the staging deck 70 into parallel sections 76, 76a, 77 and 77a serves effectively to prevent sets 29 deposited on one of the sections from being affected by later deposit of another set 29 on other sections. Thus, by the provision of four segments on each of the rollers 73 all of the patterns illustrated in FIGS. 11-26 can be accommodated.

It will be understood that in the patterns described above, a rotation of 90° in one direction could be accomplished by a rotation of 270° in the opposite direction. Similarly, a rotation of 180° could be in either direction. The directions indicated in FIGS. 11-26 are merely illustrative. In the formation of any pattern the system 20 is arranged so that as each set 29 is conveyed onto the product orienter 30 it will stop in a position corresponding to the upper right-hand corner of the container 85, as viewed in FIGS. 11-26. This is controlled by the positioning of the stop 69 longitudinally of the system path and the lateral positioning of the infeed conveyor 21 or the position of the lane-diverting mechanism thereof. If a different shape container is used or if the container 85 is to be loaded in a different orientation, a corresponding adjustment of the stopping location of each set 29 on the product orienter 30 must be made.

While the preferred embodiment of the invention has been described, it will be understood that a number of modifications thereof are possible. Thus, as indicated above, any of several different types of product accumulating devices could be used for grouping the articles 28 into sets on the infeed conveyor 21. While a pusher bar 78 has been disposed along the upper side of the staging deck 70, as viewed in FIG. 2, it will be appreciated that it could also be disposed along the opposite side or on both sides, depending on the particular patterns to be formed. Alternatively, the pusher bar 78 could be eliminated entirely, and the lane diverting mechanism of the infeed conveyor 21 could be used for selectively shifting the lateral positioning of sets 29 on the product orienter 30 to avoid interference with other sets on the staging deck 70. While the staging deck 70 has been disclosed as comprised of segmented rollers 73 for minimal friction, it will be appreciated that a flat plate could also be used. The shoe 57 has been described for facilitating shifting of sets 29 through the window section 49 of the window conveyor 40, the shoe 57 could be eliminated and the stop 69 could alone serve to sweep the sets 29 off the trailing edge of the conveyor section 47 and onto the platform 65. Finally, while discharge from the staging deck 70 has been described as being longitudinally of the system path, once the pattern has been formed it could be discharged from the staging deck 70 in any direction except back toward the product orienter 30.

From the foregoing, it can be seen that there has been provided an improved pattern former and product orienter therefor which is characterized by a completely in-line operation, the product reorienting and pattern forming all being accomplished along the longitudinal path of travel of articles through the system 20. Thus, since the product orienter 30 is disposed directly in the longitudinal path of travel of the articles along the system 20, the articles can be fed longitudinally directly onto and off of the product orienter 30 without any changes in direction of the path of travel of the articles. This results in a system of simplified construction characterized by minimum handling of the articles. Furthermore, reorientation of the article sets is accomplished by the product orienter 30 without the necessity of displacing the sets vertically from the system path.

We claim:

1. Product orienting apparatus comprising means for conveying product in a generally longitudinal path of travel, and support means disposed in said path, said support means including reorienting means defining a fixed reorienting plane and movable for reorienting said product in said plane with respect to said path, said support means including transfer means continuously movable parallel to said reorienting plane for receiving said product from said conveying means along said path and supportively carrying said product to a position overlying said reorienting means and depositing the product thereon and discharging the reoriented product along said path.

2. The product orienting apparatus of claim 1, and further including means in said path upstream of said support means for grouping individual articles of product in sets with each set including one or more articles.

3. The product orienting apparatus of claim 1, wherein said reorienting means includes rotatable means rotatably movable for reorienting said product.

4. The product orienting apparatus of claim 3, wherein said rotatable means is rotatable in either direction.

5. The product orienting apparatus of claim 1, wherein said transfer means undergoes a type of motion different from that of said reorienting means.

6. The product orienting apparatus of claim 5, wherein said reorienting means includes rotating means for reorienting the product, said support means including means movable longitudinally of said path for moving the product to and from said rotating means.

7. Product orienting apparatus comprising means for conveying product in a generally longitudinal path of travel, a turntable disposed in said path for receiving product and selectively rotatable in said path about a predetermined axis for reorienting the product with respect to said path, said turntable being immovable in directions parallel to said axis, and endless transfer means for supportively carrying the product from said conveying means to said turntable and depositing the product thereon and for moving the product from said turntable to said conveying means longitudinally of said path.

8. The product orienting apparatus of claim 7, wherein said transfer means pushes the product while moving it from said turntable.

9. The product orienting apparatus of claim 8, wherein said transfer means defines a support plane, said turntable being disposed parallel to and immediately beneath said support plane.

10. The product orienting apparatus of claim 7, wherein said transfer means includes a portion undergoing longitudinal movement parallel to said path.

11. The product orienting apparatus of claim 7, wherein said turntable is mounted for rotational movement in either direction about said axis.

12. Product orienting apparatus comprising means for conveying product in a generally longitudinal path of travel, a turntable disposed in said path for receiving product and selectively rotatable in said path for reorienting the product with respect to said path, endless transfer means including a conveyor section for receiving product from said conveying means and transporting the product along said path to a loading station disposed above said turntable and a window section for dropping the product therethrough, and means for shifting the product at said loading station from said conveyor section and through said window section onto said turntable, said conveyor section engaging the reoriented product on said turntable for moving said product from said turntable to said conveying means longitudinally of said path.

13. The product orienting apparatus of claim 12, wherein said transfer means comprising an endless conveyor having a product support reach, said turntable being disposed parallel to and immediately beneath said support product reach.

14. The product orienting apparatus of claim 12, and further including means in said path upstream of said transfer means for grouping individual articles of product in sets with each set including one or more articles.

15. The product orienting apparatus of claim 12, wherein said turntable is mounted for rotational movement in either direction about a predetermined axis.

16. The product orienting apparatus of claim 12, wherein said shifting means effects shifting of the product from said conveyor section to said turntable without lateral restraint of the product.

17. The product orienting apparatus of claim 16, wherein said conveyor section of said transfer means comprises a plurality of free rollers extending transversely of said path and spaced apart longitudinally thereof, said shifting means comprising a shoe frictionally engageable with said rollers for effecting rotation thereof in response to movement of said transfer means for shifting the product from said conveyor section.

18. Pattern forming apparatus for arranging articles into one of a plurality of different patterns, said apparatus comprising means for conveying articles in a generally longitudinal path of travel, means in said path for grouping the articles in sets with each set including one or more articles, support means disposed in said path, said support means including reorienting means defining a fixed reorienting plane and movable for reorienting said product in said plane with respect to said path, said support means including transfer means continuously movable parallel to said reorienting plane for receiving a set of articles from said conveying means along said path and supportively carrying the set to a position overlying said reorienting means and depositing the set thereon and discharging the reoriented set along said path, staging means disposed in said path for sequentially receiving a plurality of sets of articles from said support means for forming a predetermined pattern of articles, and discharge means for moving said pattern of articles as a unit from said staging means.

19. The pattern forming apparatus of claim 18, wherein said staging means comprises a bed of free rollers extending transversely of said path and spaced apart longitudinally thereof.

20. The pattern forming apparatus of claim 19, wherein each of said rollers includes two or more independently rotatable sections respectively disposed on opposite sides of the midline of said path.

21. The pattern forming apparatus of claim 18, wherein said discharge means comprises pusher means for sweeping the pattern of articles from said staging means longitudinally of said path.

22. The pattern forming apparatus of claim 18, and further including container loading means disposed in said path downstream from said staging means for receiving a pattern of articles discharged therefrom and loading the pattern of articles into an associated container.

23. The pattern forming apparatus of claim 18, wherein said reorienting means includes rotating means for reorienting the set of articles and said transfer means includes longitudinally moving means for moving the set of articles to and from said rotating means.

24. The pattern forming apparatus of claim 18, wherein the predetermined pattern comprises a planar array of the articles.

25. The pattern forming apparatus of claim 18, wherein said staging means includes means for selectively moving sets of articles thereon transversely of said path.

26. Pattern forming apparatus for arranging articles into one of a plurality of different patterns, said apparatus comprising means for conveying articles in a generally longitudinal path of travel, means in said path for grouping the articles in sets with each set including one or more articles, a turntable disposed in said path and defining a fixed reorienting plane for receiving a set of articles and selectively rotatable in said plane for reorienting the set of articles with respect to said path, staging means disposed in said path for sequentially receiving a plurality of sets of articles from said turntable for forming a predetermined pattern of articles, endless transfer means for supportively carrying sets of articles sequentially to a position overlying said turntable from said conveying means and depositing the sets on said turntable and for moving the sets from said turntable to said staging means, and discharge means for moving the pattern of articles as a unit from said staging means.

27. The pattern forming apparatus of claim 26, wherein said transfer means pushes the set of articles for moving it from said turntable.

28. The pattern forming apparatus of claim 26, and further including container loading means disposed in said path downstream from said staging means for receiving a pattern of articles discharged therefrom and loading the pattern of articles into an associated container.

29. The pattern forming apparatus of claim 26, wherein the predetermined pattern comprises a planar array of articles.

30. Pattern forming apparatus for arranging articles into one of a plurality of different patterns, said apparatus comprising means for conveying articles in a generally longitudinal path of travel, means in said path for grouping the articles in sets with each set including one or more articles, a turntable disposed in said path for receiving a set of articles and selectively rotatable in said path for reorienting the set of articles with respect to said path, endless transfer means including a conveyor section for receiving a set of articles from said conveying means and transporting the set of articles along said path to a loading station disposed above said turntable and a window section for dropping the set of articles therethrough, means for shifting the set of articles at said loading station from said conveyor section and through said window section onto said turntable, said conveyor section engaging the reoriented set of articles on said turntable for moving the set of articles from said turntable longitudinally of said path, staging means disposed in said path downstream from said turntable for sequentially receiving a plurality of sets of articles from said turntable for forming a predetermined pattern of articles, and discharge means for moving the pattern of articles as a unit from said staging means.

31. The pattern forming apparatus of claim 30, wherein said turntable is mounted for rotational movement in either direction about a predetermined axis.

32. The pattern forming apparatus of claim 30, and further including container loading means disposed in said path downstream from said staging means for receiving a pattern of articles discharged therefrom and loading the pattern of articles into an associated container.

33. The pattern forming apparatus of claim 30, wherein the predetermined pattern comprises a planar array of articles.

34. Pattern forming apparatus for arranging into one of a plurality of different patterns, articles conveyed along a generally longitudinal path of travel, said apparatus comprising means in said path for grouping the articles into sets with each set including one or more articles and discharging the sets along the path, means in said path for gathering a plurality of said sets into a predetermined pattern and discharging the pattern as a unit, and support means disposed in said path, said support means including reorienting means defining a fixed reorienting plane and movable for reorienting a set of articles in said plane with respect to said path, said support means including transfer means continuously movable parallel to said reorienting plane for receiving sets from said grouping means along said path and supportively carrying the sets to a position overlying said reorienting means and depositing the sets thereon and discharging the sets along the path, said grouping means and said gathering means and said reorienting means being disposed substantially in longitudinal alignment along said path.

35. The pattern forming apparatus of claim 34, wherein said gathering means is disposed downstream of said reorienting means.

* * * * *